(12) United States Patent
  Camilo

(10) Patent No.: US 8,729,720 B1
(45) Date of Patent: May 20, 2014

(54) EFFICIENT ENERGY PRODUCING SYSTEM

(76) Inventor: Jose Camilo, New York, NY (US)

( * ) Notice: Subject to any disclaimer, the term of this patent is extended or adjusted under 35 U.S.C. 154(b) by 361 days.

(21) Appl. No.: 13/288,150

(22) Filed: Nov. 3, 2011

Related U.S. Application Data

(60) Provisional application No. 61/412,015, filed on Nov. 10, 2010.

(51) Int. Cl.
| | |
|---|---|
| F01C 13/00 | (2006.01) |
| F01D 15/00 | (2006.01) |
| F02C 6/00 | (2006.01) |
| F02D 25/00 | (2006.01) |
| F02D 29/06 | (2006.01) |
| H02P 9/04 | (2006.01) |
| F01K 27/00 | (2006.01) |
| B63H 23/24 | (2006.01) |
| H02J 9/08 | (2006.01) |
| H02P 9/00 | (2006.01) |
| H02K 7/18 | (2006.01) |
| F02C 1/04 | (2006.01) |

(52) U.S. Cl.
CPC . *F01K 27/00* (2013.01); *H02J 9/08* (2013.01); *H02P 9/00* (2013.01); *H02K 7/1823* (2013.01); *B63H 23/24* (2013.01); *H02P 9/04* (2013.01); *F02C 1/04* (2013.01)
USPC ........................................... 290/4 R

(58) Field of Classification Search
CPC ................ H02J 9/08; H02P 9/00; H02P 9/04; H02K 7/1823; B63H 23/24; F01K 27/00; F02C 1/04
USPC ............. 290/4 R, 4 A–4 D, 44, 42, 43, 53–55
See application file for complete search history.

(56) References Cited

U.S. PATENT DOCUMENTS

2009/0129953 A1* 5/2009 Andersen ...................... 417/334
2011/0030365 A1* 2/2011 Gilboa ............................ 60/497

* cited by examiner

*Primary Examiner* — Javaid Nasri
(74) *Attorney, Agent, or Firm* — Michael J. Feigin, Esq.; Feigin & Associates, LLC

(57) ABSTRACT

A system for generating output energy with minimal input energy is disclosed. The system's components include a crankshaft, a speed multiplier, a first electrical generator, a transformer, and a fluid power circuit. The speed multiplier is coupled to the crankshaft by way of a low-speed shaft. The first electric generator is coupled to the speed multiplier by way of a high-speed shaft. The transformer is configured to receive electricity produced by the first electrical generator. The transformers output electricity is used to power the fluid power circuit. The fluid power circuit is reciprocally coupled to the crankshaft, such that operation of the fluid power circuit sets the crankshaft in motion. The fluid power circuit may be an oleo-hydraulic circuit or a pneumatic circuit. A rotor and fluid-propelled turbine may also be affixed to the crankshaft in order to set the crankshaft into motion.

13 Claims, 3 Drawing Sheets

EFFICIENT ENERGY PRODUCING SYSTEM

FIELD OF THE DISCLOSED TECHNOLOGY

The disclosed technology is geared generally towards a system for efficiently generating energy. More specifically, the disclosed technology relates to a system that utilizes a naturally occurring force and produces energy therefrom.

BACKGROUND OF THE DISCLOSED TECHNOLOGY

Wind and hydraulic power are well-known ways of harnessing naturally occurring forces in order to produce energy. Wind farms and hydraulic dams are being employed in greater numbers as fossil fuel energy resources grow scarcer and are the subject of environmental controversy.

A wind turbine generally uses large, light-weight blades mounted onto a rotor. The rotor is affixed to a shaft, the shaft being affixed to an electricity generator. Wind causes the blades to rotate, thereby rotating the rotor and therefore the shaft, causing the generator to produce electricity. Other mechanisms often accompany the system, such as speed multipliers, gear boxes and/or transformers.

Hydraulic energy producing systems operate in a similar fashion. Generally, hydropower plants use a water turbine that is rotated under the force of moving water to turn the rotor and shaft. The shaft is similarly affixed to the electric generator, thereby producing electricity.

Although these systems leave little or no environmental footprint, their application is usually restricted, due to relative inefficiency of the system. Thus, for example, wind power generators must be installed in geographic locations which are subjected to higher than average winds.

In accordance with these and other objects, which will become apparent hereinafter, the disclosed technology will now be described with particular reference to the drawings.

SUMMARY OF THE DISCLOSED TECHNOLOGY

The disclosed technology described herein addresses a need, unfulfilled in the prior art, by providing a system that more efficiently utilizes input energy to create electricity.

Accordingly, it is an object of the disclosed technology to provide a system that produces electricity with very little startup energy. In an embodiment of the disclosed technology, a system for generating output energy with minimal input energy is provided. The systems components include a crankshaft, a speed multiplier, a first electrical generator, a transformer, and a fluid power means. The speed multiplier is coupled to the crankshaft by way of a low-speed shaft. The first electric generator is coupled to the speed multiplier by way of a high-speed shaft. The high-speed shaft has a smaller diameter than the low-speed shaft. The transformer is configured to receive electricity produced by the first electrical generator. The transformer's output electricity is used to power the fluid power means. The fluid power means is reciprocally coupled to the crankshaft, such that operation of the fluid power means sets the crankshaft in motion.

In a further embodiment, the fluid power means may be an oleo-hydraulic circuit or a pneumatic circuit. The oleo-hydraulic circuit of embodiments of the disclosed technology has two cylinders, two valves, a liquid storage reservoir and a pump. All of the components are connected to form a closed circuit. The cylinders each have a piston head within. The connecting rods of the pistons are reciprocally fixed to the crankshaft, such that when one piston is fully retracted out of its cylinder, the other is fully extended into the cylinder. Each cylinder has a valve associated with it. The valves regulate the flow of liquid into and out of the cylinders. The pump transports the liquid to and from the cylinders and reservoir, and throughout the circuit. In some embodiments, the liquid used may be oil.

The pneumatic circuit of embodiments of the disclosed technology uses two linear actuators, two valves, an air tank, and an air compressor. Each of the linear actuators is airtight, and has a rod portion extending therefrom. The rods of the linear actuators are affixed in reciprocal communication with the crankshaft in similar fashion to that described with respect to the hydraulic circuit. The air compressor is connected in circuit with the air tank and each of the linear actuators via their respective valves.

In further embodiments of the disclosed technology, a second electrical generator is provided in parallel with the first electrical generator. The purpose of the second electrical generator is to extract electricity from the system, whereas the first electrical generator feeds electricity back into the system (to power the fluid power means). In other embodiments, the first electrical generator may be a self-excited generator, as explained further in the "Detailed Description". Self-excited generators are capable of storing energy while running sufficiently to restart the generator after powering off.

In still further embodiments of the disclosed technology, a rotor may also be included in the system. The rotor is configured to be coupled to an external source of energy sufficient to rotate the rotor, and therefore to set the system in motion. The rotor may be coupled to, for example, a fluid-propelled turbine, that is, a turbine that is capable of being set in motion under force of liquid or wind flowing across its blades.

In another embodiment of the disclosed technology, a system for generating output energy with minimal input energy is provided. The system's components include a crankshaft, a rotor, a speed multiplier, a first electrical generator, a second electrical generator, a transformer, and an oleo-hydraulic circuit. The rotor is coupled to the crankshaft and is configured to provide startup energy to the system. The speed multiplier is coupled to the crankshaft by way of a low-speed shaft. A high-speed shaft couples the speed multiplier to a first and a second electrical generator in parallel by way of a high-speed shaft. The high-speed shaft has a smaller diameter than the low-speed shaft. The transformer receives input electricity from the first electrical generator. The transformer converts the current in order to power a pump of the oleo-hydraulic circuit. In addition to the pump, the oleo-hydraulic circuit includes two cylinders, two valves, and a reservoir for storing oil. The pump is connected in circuit with the reservoir and each of the cylinders by way of the valves. The pump is operable to transport oil between the reservoir and the cylinders. Each cylinder has a head of a piston disposed therein. Connecting rod portions of the pistons are affixed to the crankshaft in reciprocal communication.

In further embodiments of the disclosed technology, the first generator may be a self-excited generator capable of setting the system in motion, using stored, previously generated, energy. In still further embodiments, a fluid-propelled turbine may be coupled to the rotor. The turbine is operable to turn the rotor by using force provided by a naturally flowing gas or liquid, such as wind or water. The turbine may be a wind turbine, with blades capable of harnessing wind power to turn the rotor.

A better understanding of the disclosed technology will be obtained from the following detailed description of embodiments of the disclosed technology taken in conjunction with the drawings.

DETAILED DESCRIPTION OF EMBODIMENTS OF THE DISCLOSED TECHNOLOGY

The presently disclosed technology is a machine, or system of machines, that efficiently outputs energy with very little initial input energy. The machine or system may be adapted to have widespread applications. An example of such applications may include powering an automobile after initial acceleration, or independently generating electricity using wind power.

The system may be comprised of the following components: a crankshaft, a speed multiplier, one or more generators (self-excited, separately excited, shunt, or compound), a transformer, an oleo-hydraulic circuit, and/or a pneumatic circuit.

The oleo-hydraulic circuit used in embodiments of the disclosed technology is a closed-circuit which has two cylinders, two valves, a pump, an oil reservoir, and fluid hoses between the components.

Figure 1:
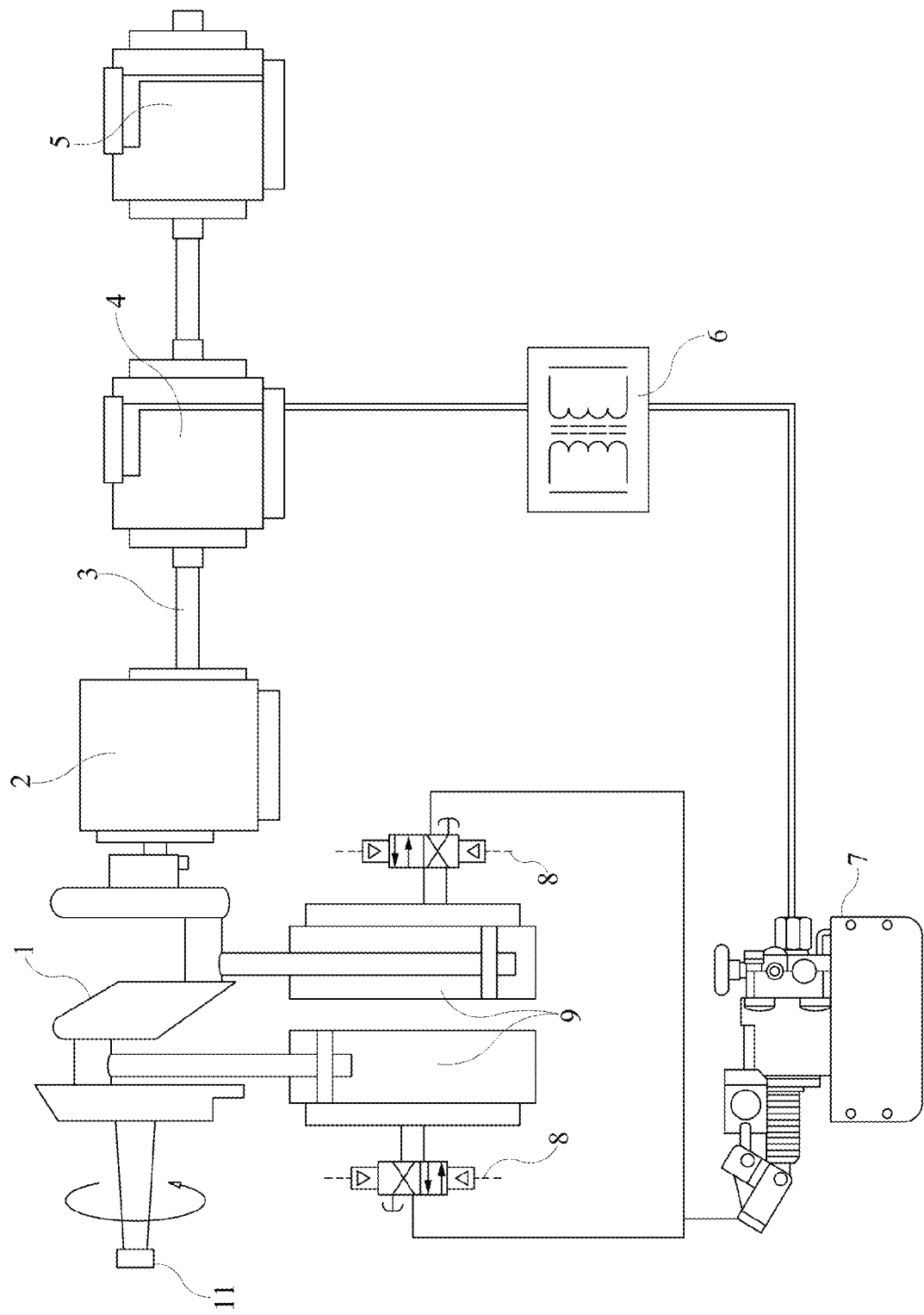
FIG. 1 is diagrammatic view showing the components of a system of an embodiment of the disclosed technology.

Referring now to the figures, FIG. 1 is a diagrammatic view showing the components of a system of an embodiment of the disclosed technology. A crankshaft 1 is shown coupled to a lever or rotor 11. The system may be set in motion initially by using the rotor 11. The rotor 11 may be rotated by a person, by a fluid-propelled blade 30, or by any other means which plausibly can initiate rotation of the crankshaft 1. In one embodiment, the energy applied via the lever is the only energy inputted into the system. From this point, the system may be self-powered for an extended period of time.

The crankshaft 1 is further coupled to a speed multiplier 2 by way of a low-speed shaft. The speed multiplier 2 is a mechanical component which multiplies angular speed under a constant transmission ratio. The speed multiplier 2 is essentially a gearbox with an input and an output shaft. The input shaft is a low-speed shaft and the output shaft is a high-speed shaft 3. The diameter of the low-speed shaft is greater than that of the high-speed shaft 3. An increase in speed is needed because the lever/crankshaft turns at a much lower speed (but with much greater force) than is required by an electrical generator 4.

Referring still to FIG. 1, a high-speed shaft 3 is shown extending from the output of the speed multiplier 2. The high-speed shaft 3 is rotatably coupled to a first electrical generator 4. In embodiments of the disclosed technology, the high-speed shaft 3 may further be rotatably coupled to a second electrical generator 5 in parallel. The purpose of the first electrical generator 4 is to transfer energy back into the system to keep the crankshaft 1 in motion. The process by which the first generator 4 keeps the system in motion will be described in detail below.

As for the second electrical generator 5, its electrical output is harvested and/or used externally in any electrical application. The system/machine may be calibrated in order to delegate the energy input into the two electrical generators. In embodiments of the disclosed technology, one or both of the generators may be self-excited generators. A self-excited generator is defined as having a magnetic field received from its own output. The magnetism is stored in electromagnets. When the generator is stopped, the stored magnetism is used to restart the generator. Thus, in this embodiment, one of the generators may be used to restart the system, as opposed to the manual lever/crankshaft starting mechanism.

Referring still to FIG. 1, a connection is shown from the first electrical generator 4 to a transformer 6. The transformer 6 is further shown as being connected to an oleo-hydraulic pump 7. The idea is that the electricity generated from the first electrical generator 4 is used to power the oleo-hydraulic pump 7, and in turn the oleo-hydraulic circuit as a whole. The purpose of the transformer 6 between the electrical generator 4 and the oleo-hydraulic pump 7 is to transfer the voltage and/or current outputted by the generator to the voltage/current required by the oleo-hydraulic pump.

The oleo-hydraulic system used in embodiments of the disclosed technology is a circuit which has two cylinders 9, two valves 8, a pump 7, an oil reservoir, and fluid hoses between the components. Generally, an oleo-hydraulic circuit uses fluid (usually oil) to transmit hydraulic power produced by a pump to operate a mechanical apparatus. In an embodiment of the disclosed technology, the pump is powered by the first electrical generator 4 by way of the transformer 6. The pump 7 injects fluid from the provided reservoir through fluid hoses to the cylinders 9. The cylinders 9 each contain a hydraulic piston, each hydraulic piston being fixed to a portion of the crankshaft 1. Directional control valves 8, connected between each of the cylinders and the pump, operate to control the fluid flow direction. The whole circuit operates through proper calibration of the valves.

The crankshaft 1 is set in motion through reciprocal automation. The crankshaft 1, pistons, and cylinders 9 are configured such that when the first piston is fully extended into the first cylinder, the second piston is retracted almost to the top of the second cylinder. In this position, the second cylinder is filled with fluid. At this point, each of the valves' directional flows is reversed. Thus, the pump 7 begins to pump fluid out of the second cylinder and into the first cylinder. This transfer of fluid hydraulically causes the first piston to retract, and the second piston to extend. In turn, the crankshaft 1 is set in motion, thereby eliminating the need for the lever 11 to be manually operated once the whole system has been initially set in motion. The valves 8 are configured to continuously reverse flow directions to keep the circuit in motion.

To recap, the system is initially set in motion by way of a lever/rotor attached to a crankshaft. The crankshaft rotates a low-speed shaft which is the input for a speed multiplier. The output of the speed multiplier is a high-speed shaft with a smaller diameter, but higher rotational velocity compared to that of the low-speed shaft. The rotational velocity of the high-speed shaft is then converted into electricity using one or two electrical generators. One generator operates to provide electricity to keep the system in motion. The second generator is used to generate electricity for use outside the system (i.e. to power an engine). Electricity from the first generator is then transferred through a transformer to be used by an electrical hydraulic pump. The pump then operates to pump oil to and from the two cylinders in order to promote movement of pistons within the cylinders. Valves control the direction of the flow to and from each of the cylinders. The pistons are connected to the crankshaft in an arrangement which enables the rotation of the crankshaft when the pistons go up and down.

In a further embodiment of the disclosed technology, a rotor and aerogenerator configuration is used in place of a lever. An aerogenerator is any blade or fan-like arrangement which is caused to turn by natural wind forces. The aerogenerator's turning causes the rotor to rotate, which causes the crankshaft to turn, thereby setting the system in motion. Thus, one application of the disclosed technology may be in the efficient production of electricity using windpower.

In yet another embodiment of the disclosed technology, the second electrical generator may be located on the side of the crankshaft opposite to the first electrical generator. In this embodiment, a second speed multiplier would be required between the crankshaft and second generator.

Figure 2:
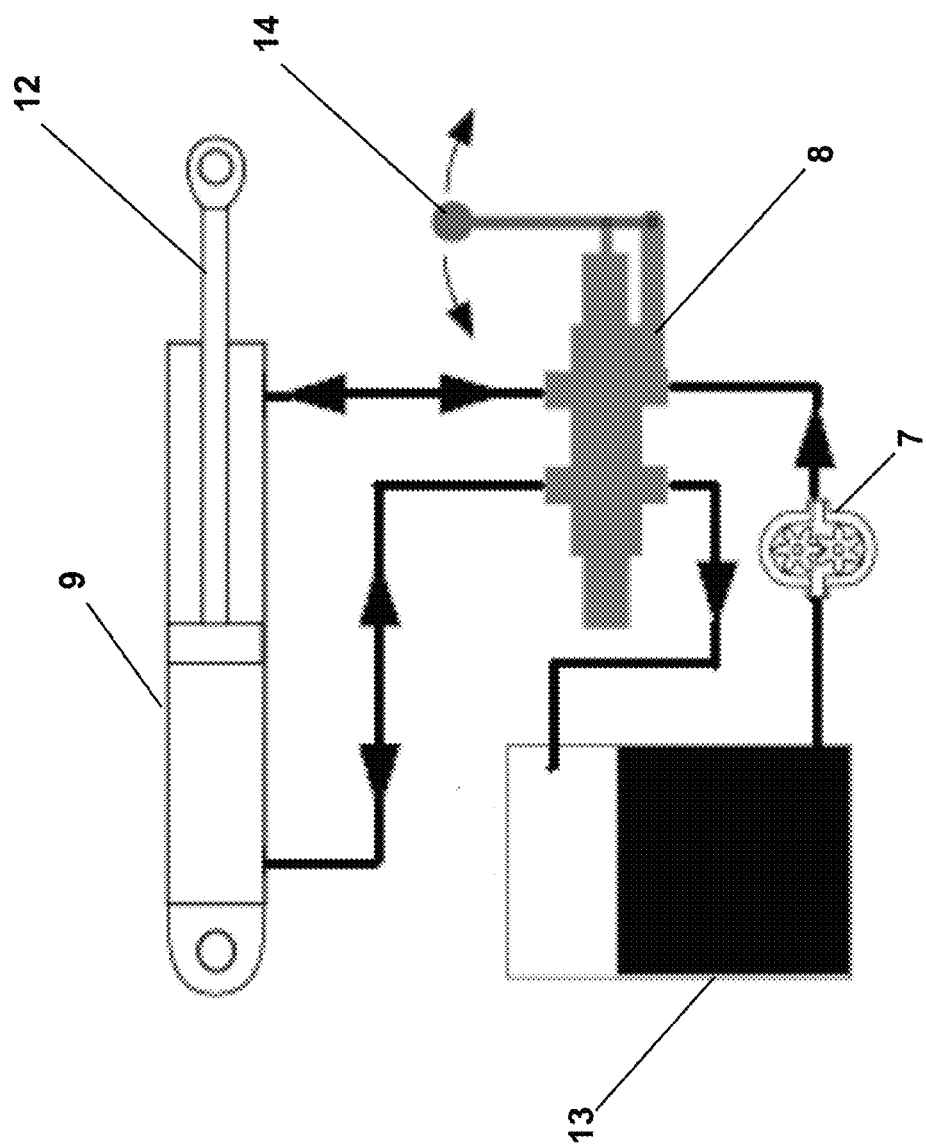
FIG. 2 is diagrammatic view showing an exemplary hydraulic circuit of a system of an embodiment of the disclosed technology.

FIG. 2 is diagrammatic view showing an exemplary hydraulic circuit of a system of an embodiment of the disclosed technology. Connected in the circuit are a piston cylinder 9, a valve 8, a pump 7, and liquid reservoir 13. The components of the system are all connected to one another by way of fluid hoses. The piston cylinder 9 contains a piston 12 disposed therein. The connecting rod 20 of the piston 12 attaches to the external body that requires moving. The cylinder 9 is air-tight above and below the piston head. Moreover, the whole circuit is airtight and continuous, such that liquid cannot be added or removed. The circuit operates by way of the pump 7 pumping fluid from the reservoir into the valve 14. As shown, the valve 8 has two injection points into the piston cylinder 9—one below the piston head and one above it. A toggle 14 is a part of the valve that regulates the flow into and out of the valve. The toggle 14 is usually operated electronically and automatically.

Referring still to FIG. 2, when the system requires the connecting rod 20 to be extended, the valve 8 causes the fluid transported by the pump 7 to be injected into the void below the piston head, thereby causing the fluid contained above the piston head to be extracted therefrom. As a result, the force of the liquid injection causes the piston 12 to be moved outwards and extend from the cylinder 9. When the connecting rod 20 needs to be retracted, the circuit operates in the opposite direction by pumping fluid into the void above the piston head, thereby extracting fluid from the void below the piston head.

Figure 3:
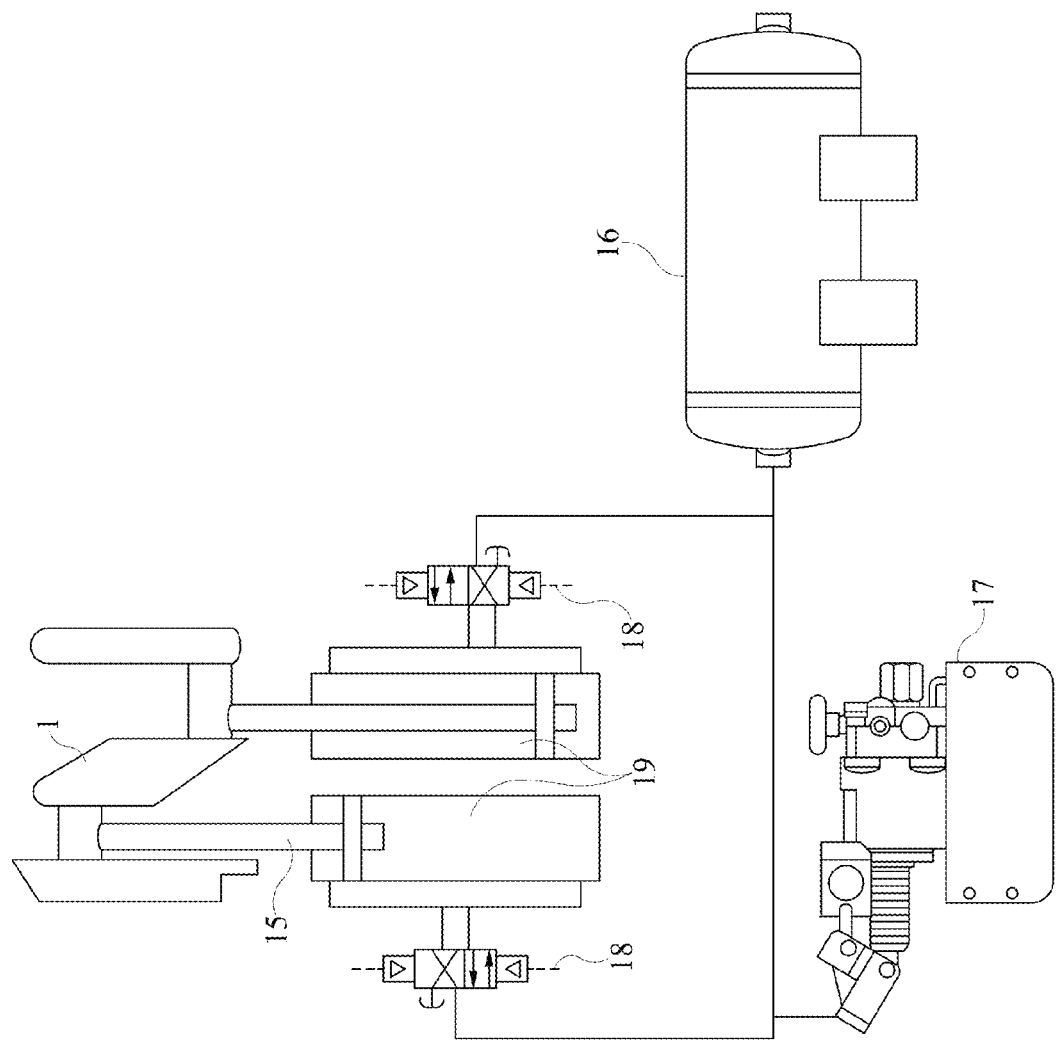
FIG. 3 is a close-up diagrammatic view showing a pneumatic circuit of a system of an embodiment of the disclosed technology.

FIG. 3 is a close-up diagrammatic view showing a pneumatic circuit of a system of an embodiment of the disclosed technology. As stated, in an alternative embodiment of the disclosed technology a pneumatic pump/circuit may be used in place of the oleo-hydraulic pump/circuit. The pneumatic circuit operates in a manner similar to that of the oleo-hydraulic circuit, except that the pneumatic circuit uses air instead of a liquid. Thus an air tank 16 is provided, and an air pump 17 operates to pump air to and from the linear actuator cylinders 19. The varying air pressure in the cylinders causes movement of linear actuator rod 15 and, in turn, movement of the crankshaft 1. The crankshaft 1 is rotated by the rotor 11, which is in turn, coupled to a turbine 40. The turbine 40 may be propelled by fluid, such as, for example, wind. The linear actuators 19 are designed such that the piston ends of the rods are arranged within the cylinders to be flush with the inner walls of the cylinders, in order to prevent the leakage of air. Oil or some other lubricant may be used to decrease friction between the piston and linear actuator cylinder walls.

While the present disclosure may be susceptible to embodiment in different forms, the drawings show, and herein will be described in detail, embodiments with the understanding that the present description is to be considered an exemplification of the principles of the disclosure and is not intended to be exhaustive or to limit the disclosure to the details of construction and the arrangements of components set forth in the following description or illustrated in the drawings.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described hereinabove are also contemplated and within the scope of the invention.

I claim:

1. A system for generating output energy with minimal input energy comprising:
   a crankshaft;
   a speed multiplier, said speed multiplier coupled to said crankshaft via a low-speed shaft;
   a first electrical generator coupled to said speed multiplier via a high-speed shaft, said high-speed shaft comprising a smaller diameter than that of said low-speed shaft;
   a transformer, said transformer receiving input electricity from said first electrical generator;
   a fluid power means that is powered by output electricity from said transformer;
   a rotor coupled to a fluid-propelled blade, said blade operable to turn said rotor using force provided by naturally flowing fluid; and
   said fluid power means being reciprocally coupled to said crankshaft, such that operation of said fluid power means sets said crankshaft in motion.

2. The system of claim 1, wherein said fluid power means comprises an oleo-hydraulic circuit, said oleo-hydraulic circuit comprising:
   two cylinders, each cylinder having a head of a piston disposed therein, connecting rods of each of said pistons being in fixed reciprocal communication with said crankshaft;
   two valves, each valve regulating flow of a liquid into each of said cylinders;
   a reservoir for storing liquid; and
   a pump connected in circuit with said reservoir and each of said cylinders via said valves, said pump operable to transport liquid between said reservoir and each of said cylinders.

3. The system of claim 2, wherein said liquid comprises oil.

4. The system of claim 3, further comprising a second electrical generator, said second electrical generator rotatably coupled in parallel with said first electrical generator; and said second electrical generator producing output electricity to be used outside said system.

5. The system of claim 4, wherein said first generator is a self-excited generator capable of setting said system in motion using previously generated energy stored in said first electrical generator.

6. The system of claim 1, wherein said fluid power means comprises a pneumatic circuit, said pneumatic circuit comprising:
   two linear actuators, a rod portion of each of said linear actuators being extended from said linear actuator and affixed in reciprocal communication with said crankshaft;
   two valves, each valve regulating flow of air into each of said linear actuators;
   a tank for storing air; and an air compressor connected in circuit with said tank and each of said linear actuators via said valves, said pump operable to transport air between said reservoir and each of said cylinders.

7. The system of claim 6, further comprising a second electrical generator, said second electrical generator rotatably coupled in parallel with said first electrical generator; and said second electrical generator producing output electricity to be used outside the system.

8. The system of claim 7, wherein said first generator is a self-excited generator capable of setting said system in motion using previously generated energy stored in said first electrical generator.

9. The system of claim 7, further comprising a rotor, said rotor coupled to an external source of energy such that movement of said rotor starts said system in motion.

10. The system of claim 9, wherein said rotor is coupled to a fluid-propelled turbine, said turbine operable to turn said rotor using force provided by a naturally flowing fluid.

11. A system for generating output energy with minimal input energy comprising:
   a crankshaft;
   a rotor, said rotor coupled to said crankshaft and configured to provide startup energy capable of setting said system in motion;
   a speed multiplier, said speed multiplier coupled to said crankshaft via a low-speed shaft;
   a first electrical generator coupled to said speed multiplier via a high-speed shaft, said high-speed shaft comprising a smaller diameter than that of said low-speed shaft;
   a second electrical generator rotatably coupled in parallel with said first electrical generator, said second electrical generator producing output electricity to be used outside the system;
   a transformer, said transformer receiving input electricity from said first electrical generator;
   a fluid-propelled turbine coupled to said rotor, said turbine operable to turn rotor using force provided by a naturally flowing fluid; and
   an oleo-hydraulic circuit, said oleo-hydraulic circuit comprising:
      two cylinders, each cylinder having a head of a piston disposed therein with connecting rods of each of said pistons being in fixed reciprocal communication with said crankshaft;
      two valves, each valve regulating flow of oil into each of said cylinders;
      a reservoir for storing said oil; and
      a pump connected in hydraulic circuit with said reservoir and each of said cylinders via said valves, and operable to transport oil between said reservoir and each of said cylinders, said pump powered by said transformer.

12. The system of claim 11, wherein said first generator is a self-excited generator capable of setting said system in motion using previously generated energy stored in said first electrical generator.

13. The system of claim 11, wherein said fluid-propelled turbine is a wind turbine.

* * * * *